May 21, 1957 J. P. STEFAN 2,792,722
AUTOMATIC TRANSMISSIONS
Filed Nov. 9, 1953

INVENTOR.
JOSEPH P. STEFAN
by C. James Cottrell
Attorney

United States Patent Office 2,792,722
Patented May 21, 1957

2,792,722
AUTOMATIC TRANSMISSIONS

Joseph P. Stefan, Sacramento, Calif.

Application November 9, 1953, Serial No. 390,859

6 Claims. (Cl. 74—688)

This invention relates to automatic automobile transmissions and torque converters; and more particularly to the provision of a device for automatically changing gear ratios according to the torque developed and demanded.

It is an object of the invention to provide a transmission device for continuously and completely changing gear ratio from no rotation of the driven part on up to and until the driven part rotates at the same revolutions per minute as the driving part; that is, until the driven part and the driving part turn in unison, with no slippage and loss or waste of power.

A further object is to provide an automatic transmission device for automobiles and the like, which is inexpensive to manufacture and maintain, the device being highly efficient and durable and is adapted for use on all kinds of automotive machines, such as pleasure cars, heavy duty trucks, and tractors.

These and other objects are attained by the novel construction and arrangement of parts hereinafter described and illustrated by the accompanying drawings, forming a part hereof, and in which.

Figure 1:
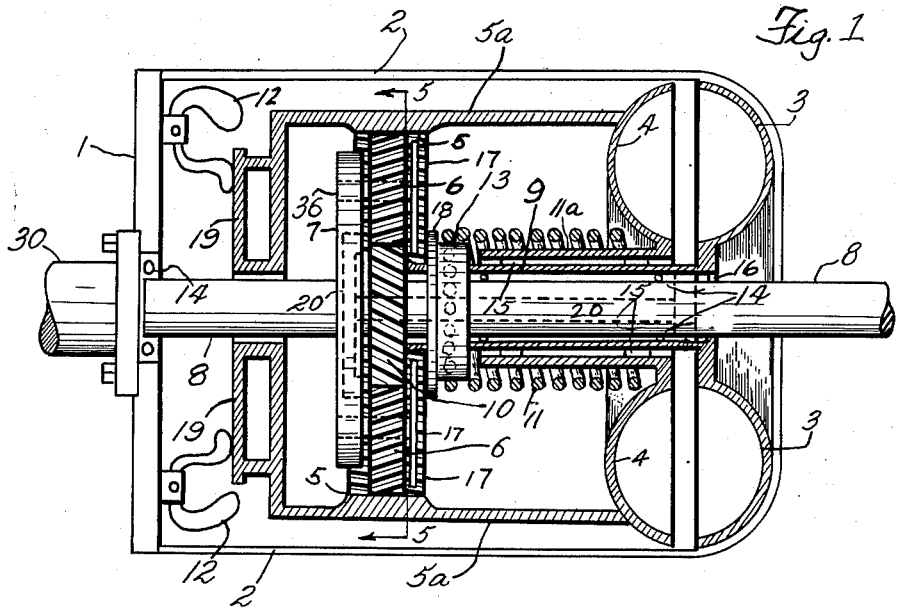
Fig. 1 is an elevational sectional view of a transmission device embodying the invention.
Figure 2:
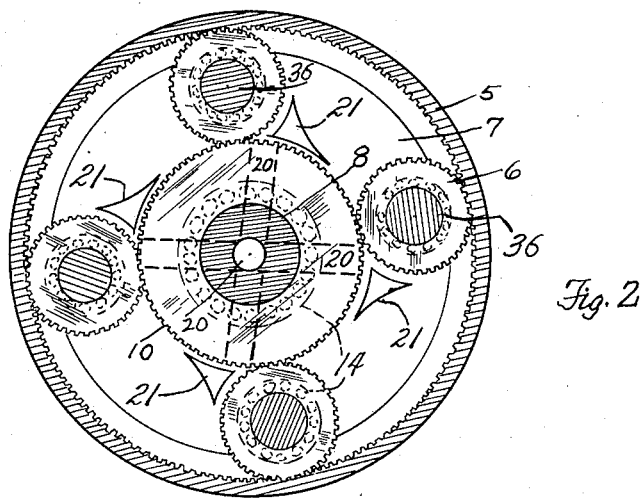
Fig. 2 is a sectional view taken on the line 2—2 of Fig. 1.

Referring to the drawings, the hydraulic torque regulator and gear ratio changer is shown to comprise a driving or input shaft 30 which is attached to a flywheel or front cover 1 of a transmission housing 2, which is attached to a hydraulic pump 3, which is attached to a tube 9, the latter being attached to and driving a sun gear 10, rotatably mounted on a driven or output shaft 8 by ball bearings 14.

The sun gear 10 is arranged to mesh with planetary gears 6, which mesh with a ring gear 5 on a ring gear carrier 5a, which is attached to a hydraulic turbine 4, which has attached thereto a tube 11a supporting a turbine pressure spring 11, surrounding at one end a thrust bearing 13 and engaging a flange 18, integral with bearing 13 and connected to the drive tube 9. The tube or sleeve 11a rests on roller bearings 15 supported by sun gear drive tube 9.

The ring gear 5 is designed to move laterally on the planetary gears 6, and the ring gear carrier 5a has flanges 19 engaging turbine pressure regulating governors 12 to move the carrier 5a laterally in one direction depending on the centrifugal force produced by the governors 12.

The planetary gears 6 are mounted on stub shafts 36 integral with a planetary gear carrier 7 attached to the output or driven shaft 8. The carrier 7 and shaft 8 are provided with a passage 20 leading oil to the space between pump 3 and turbine 4, oil seals 16 being provided at the positions shown.

A spacer partition 21 is attached to the carrier 7 adjacent the sun and planetary gears, and is machined so that it fits closely to the gears, so that oil loaded teeth of the gears pass by part 21. With the gear shield 17 in place, the oil will be locked in the teeth, and cannot escape until the planetary gear 6 and the sun gear 10 start to mesh, at which time when the teeth are fully meshed, the oil is forced out of the teeth into the oil passage 20, exiting out of passage 20 into the pump and turbine, exiting again at the outer side of the turbine 4 to return on another journey.

This oil pump feature is provided to keep pump 3, and turbine 4, to force the turbine 4, from pump 3, thereby helping the ring gear 5, so that along with the twisting force of ring gear 5 (which has the teeth machined on an angle or spiral) on planetary gear 6, will move the turbine 4, from pump 3, and allow slippage to occur, to slow down or hold the ring gear 5 stationary. At this stage the planetary gear system is in a low ratio, all of this taking place when there is a demand for torque at the output shaft 8, and in varied amounts according to the torque demand. The unit is about three-fourths full of oil at all times.

As stated above, the teeth on the planetary gears 6 and the ring gear 5 are machined on such an angle or spiral, about two times the width of the planetary and sun gear, so that the twisting forces of ring gear 5 and planetary gears 6, being in opposite directions (ring gear 5 being clockwise and planetary gears 6 being counterclockwise), will tend to pull ring gear 5 and attached ring gear carrier 5a and turbine 4 away from pump 3 to allow slippage. The ring gear 5 has two functions, i. e. to help control the movement of the turbine 4, and to regulate the ratio of the planetary system.

In operation, primary power flows from shaft 30 to flywheel 1, to housing 2, to pump 3, to sun gear drive tube 9, to sun gear 10. The secondary power flows from turbine 4 to ring gear 5, and thus the primary and secondary powers meet at the planetary gears 6, and change into output power, which is of either high or low torque (depending on the position of turbine 4 and gear 5), and flows through planetary gear carrier 7 and output shaft 8.

Now assuming the transmission is used in an automobile at stand still and is to make a fast start, requiring a lot of power at the rear axle. When the operator presses the accelerator pedal, the engine turns the input shaft 30 at a fast rate in clockwise rotation, and the transmission housing 2, pump 3, sun gear 10 will turn at the same rate of speed and in the same direction, looking at it from the input end. At this stage, the output shaft 8 and planetary gear carrier 7 are stationary. The sun gear 10 will tend to turn the planetary gears counterclockwise, the ring gear 5 turning counterclockwise. But the gear 5, being attached to the turbine 4, will be prevented from turning counterclockwise because pump 3 will turn the turbine 4 in a clockwise direction. So at the first stage, the ring gear 5 with the machined teeth, being attached to turbine 4, the twisting action of gear 5 on gear 6 will pull the turbine 4 away from pump 3, causing slippage to occur, which allows turbine 4 and gear 5 to stand still. Now the sun gear 10 is still tending to turn gears 6 in a counter-clockwise direction, the ring gear 5 being held stationary by the slippage of turbine 4. The planetary gears 6 being mounted on the carrier 7 will cause the carrier and output shaft 8 to move clockwise, and the automobile will start to move. At this stage the planetary gear system is in a low ratio, and the gear 6 and sun gear 10 are rotating in the ring gear 5 and acting as four oil pumps forcing oil into passage 20, and into pump 3 and turbine 4, the latter being forced away from pump 3 and helps the gear 5 to control the movement of the turbine 4 and consequently controlling the slippage. Also, the turbine pressure spring 11 and the force of the turbine regulating governors 2 are being counteracted by the aforesaid functions of the ring gear 5, and the oil pump feature of gears 6 and 10. Now assume the automobile is gaining momentum and the need for power lessens.

Consequently, the twisting action of gear 5 and gears 6 is lessened, allowing ring gear 5 to start turning, and gears 6 will start to turn less, pumping less oil into the pump 3 and turbine 4, allowing spring 11 and governors 12 to force turbine 4 closer to pump 3, allowing less slippage so that the turbine 4 will turn ring gear 5 still faster, and the planetary gear system is in a higher gear ratio. This goes on until the automobile has acquired the desired speed and little or no power is needed at the output shaft 8.

The shield 17 is a flat ring, or cover (integral with stub shaft 36, spacer 21, and planetary gear carrier 7) its hole in the center being about one inch in diameter smaller than the outside diameter of the sun gear 10. Its purpose is to shield the teeth of the sun gear 10 and a portion of the teeth of each planetary gear 6, to keep the oil locked between the teeth of the planetary gear 6, and sun gear 10, so that, as the oil loaded teeth of the planetary gear 6, and sun gear 10, pass by spacer 21, and start to mesh (come in contact or enter into each other), the oil can not escape anywhere, but will be forced into oil passage 20 as the teeth of the gears mesh fully, or enter into each other all the way (the planetary gear carrier 7 acts as a shield for the other side of the gears. There is less twisting of the gear 5 on gears 6, and governors 12 and spring 11 will force turbine 4 close to pump 3 allowing no slippage, the turbine 4 turning as fast as pump 3 and gear 10. The gears 6 will be locked between the gear 10 and gear 5, and therefore, the carrier 7 and shaft 8 will be turning at the same speeds as gear 10, ring gear 5, turbine 4 and pump 3, and the whole unit is turning as one unit. The planetary is now in its highest gear ratio or in direct drive; and no oil is pumped into passage 20 to exert pressure between turbine 4 and pump 3, and thus allowing no slippage or waste of power.

The unit will stay in this stage when slowing down or using the engine as a brake. When more power is needed the unit will go through the stages above described.

The turbine pressure spring 11 will also hold the turbine 4 close to the pump 3, in slow speeds or city driving where little or no power is needed to keep the automobile in motion.

The above description is to be considered as illustrative and not limitative of the invention of which modifications may be made without departing from the spirit and scope of the appended claims.

The invention having been described, what is claimed is:

1. In a transmission device, a power input drive shaft, a housing driven by said shaft, a hydraulic pump connected to said housing, a sun gear, a drive tube connected to the sun gear and pump, a plurality of planetary gears arranged mesh with said sun gear, a planetary gear carrier upon which the planetary gears are mounted, an output or driven shaft attached to the carrier, a ring gear meshing with said planetary gears and movable axially of the shafts, a hydraulic turbine, means connected with the ring gear to move said turbine towards the pump, and means for forcing a fluid such as oil between said turbine and pump to cause slippage between the pump and turbine.

2. The structure set forth in claim 1 further characterized by said oil forcing means comprising an oil passage in said carrier and driven shaft communicating with the space between the pump and turbine and means positioned adjacent the contacts of the sun gear with the planetary gears to guide oil forced from the teeth of said gears when they fully mesh, into said passage.

3. The structure set forth by claim 2 further characterized by a carrier for the ring gear, and governors mounted on said housing arranged to engage the ring gear carrier to aid in forcing the turbine towards said pump.

4. The structure set forth in claim 2 further characterized by spring means engaging said sun gear structure and the turbine to urge the turbine towards the pump.

5. The structure set forth in claim 2 further characterized by said ring gear and planetary gears having teeth machined at an angle or spiral to shift the ring gear laterally to move the turbine relative to the pump depending upon torque produced by the load on the load on the driven shaft.

6. The structure set forth in claim 2 further characterized by oil seals positioned the driven shaft and the sun gear drive tube.

References Cited in the file of this patent

UNITED STATES PATENTS

| | | |
|---|---|---|
| 1,203,265 | Radcliffe | Oct. 31, 1916 |
| 2,240,650 | Heyer | May 6, 1941 |
| 2,303,829 | Dodge | Dec. 1, 1942 |
| 2,336,167 | Dillon | Dec. 7, 1943 |
| 2,461,022 | Barnack | Feb. 8, 1949 |

FOREIGN PATENTS

| | | |
|---|---|---|
| 689,925 | Great Britain | Apr. 8, 1953 |
| 945,381 | France | Nov. 29, 1948 |